(12) United States Patent
Reich

(10) Patent No.: US 7,540,134 B1
(45) Date of Patent: Jun. 2, 2009

(54) RIDING MOWER WITH DECK HEIGHT ADJUSTMENT

(76) Inventor: Pat Reich, 1616 G St., Auburn, NE (US) 68305

( * ) Notice: Subject to any disclaimer, the term of this patent is extended or adjusted under 35 U.S.C. 154(b) by 697 days.

(21) Appl. No.: 10/821,026

(22) Filed: Apr. 8, 2004

Related U.S. Application Data

(60) Provisional application No. 60/488,028, filed on Jul. 17, 2003.

(51) Int. Cl.
*A01D 34/00* (2006.01)
(52) U.S. Cl. ............... 56/17.1; 56/14.9; 56/DIG. 22
(58) Field of Classification Search .............. 56/12.7, 56/14.7, 14.9, 17.1, 208, DIG. 22, 209, 320.1
See application file for complete search history.

(56) References Cited

U.S. PATENT DOCUMENTS

| | | | |
|---|---|---|---|
| 2,848,859 A | 8/1958 | Abel | |
| 3,269,100 A * | 8/1966 | Smith | 56/17.2 |
| 3,512,344 A | 5/1970 | Kortum | |
| 4,120,136 A * | 10/1978 | Rose | 56/17.1 |
| 4,420,925 A * | 12/1983 | Webster | 56/15.9 |
| 4,840,020 A | 6/1989 | Oka | |
| 5,138,825 A | 8/1992 | Trefz et al. | |
| 5,230,208 A * | 7/1993 | Hess et al. | 56/17.2 |
| 5,351,467 A | 10/1994 | Trefz et al. | |
| 5,381,648 A | 1/1995 | Seegert et al. | |
| 5,526,633 A | 6/1996 | Strong et al. | |
| 5,697,455 A | 12/1997 | Deckler | |
| 5,784,870 A | 7/1998 | Seegert et al. | |
| 5,797,252 A | 8/1998 | Goman | |
| 5,816,033 A | 10/1998 | Busboom et al. | |
| 5,867,970 A | 2/1999 | Ehrhart et al. | |
| 6,041,584 A | 3/2000 | Hohnl | |
| 6,412,258 B1 | 7/2002 | Doerflinger | |
| 6,494,028 B2 | 12/2002 | Moore | |
| 6,837,032 B1 * | 1/2005 | Swartzendruber et al. | 56/14.9 |
| 6,874,308 B1 * | 4/2005 | Bartel | 56/16.2 |

* cited by examiner

*Primary Examiner*—Alicia M Torres

(57) ABSTRACT

A riding mower includes an apparatus for adjusting the height of a mowing deck. The mowing deck is supported relative to a frame of the riding mower by a deck lift system. The deck lift system is actuated by a foot activated lever, with an arm linking the lever to the deck lift system. A cam wheel having an outer radial edge of varying radius is rotationally mounted near an operator seating area of the mower. A shoulder is disposed on the arm to contact the outer radial edge of the cam wheel when the mowing deck is in a lowered position. The height of the mowing deck relative to a ground surface is a function of the outer radial edge oriented for contact with the shoulder of the arm.

10 Claims, 17 Drawing Sheets

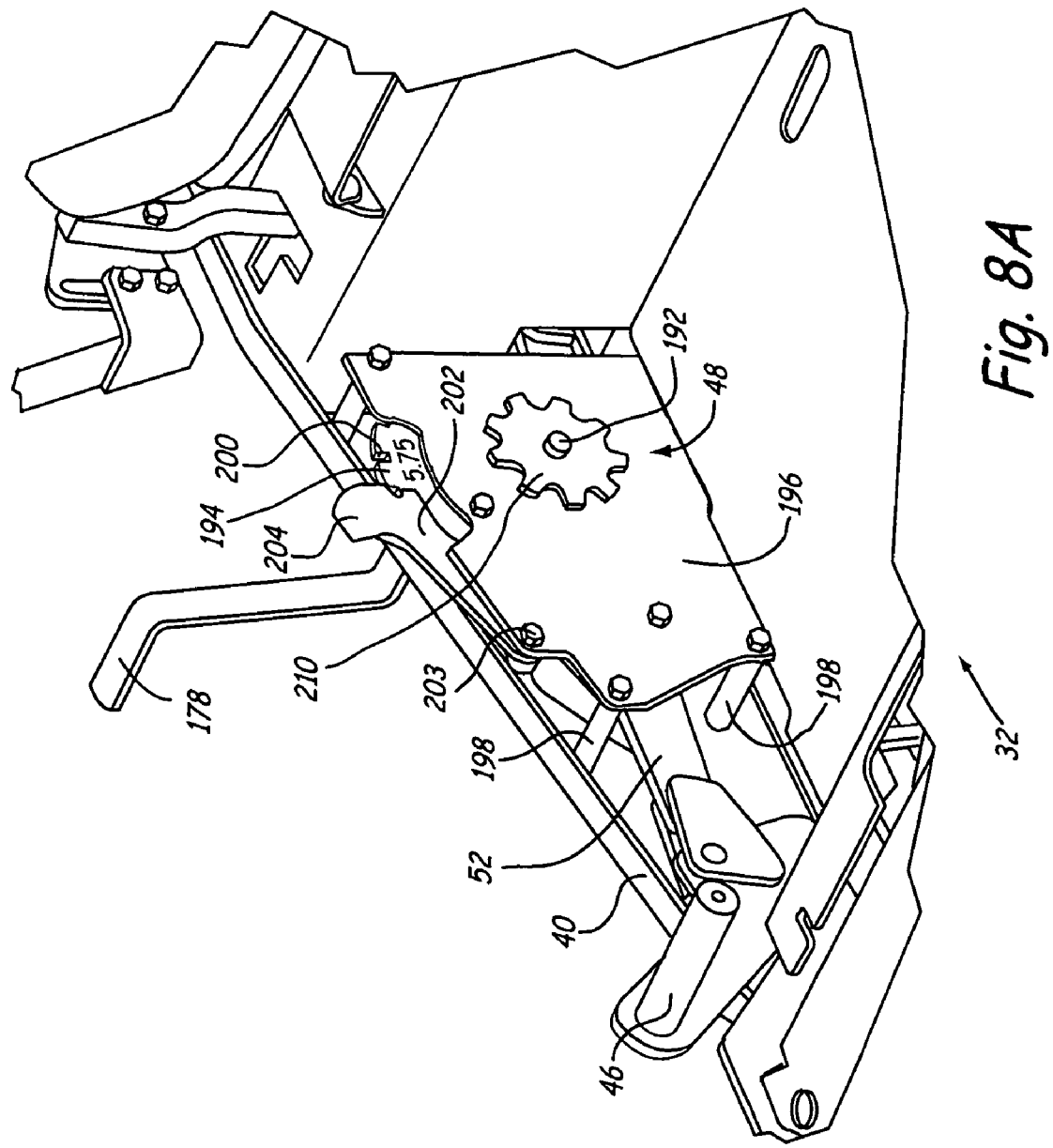

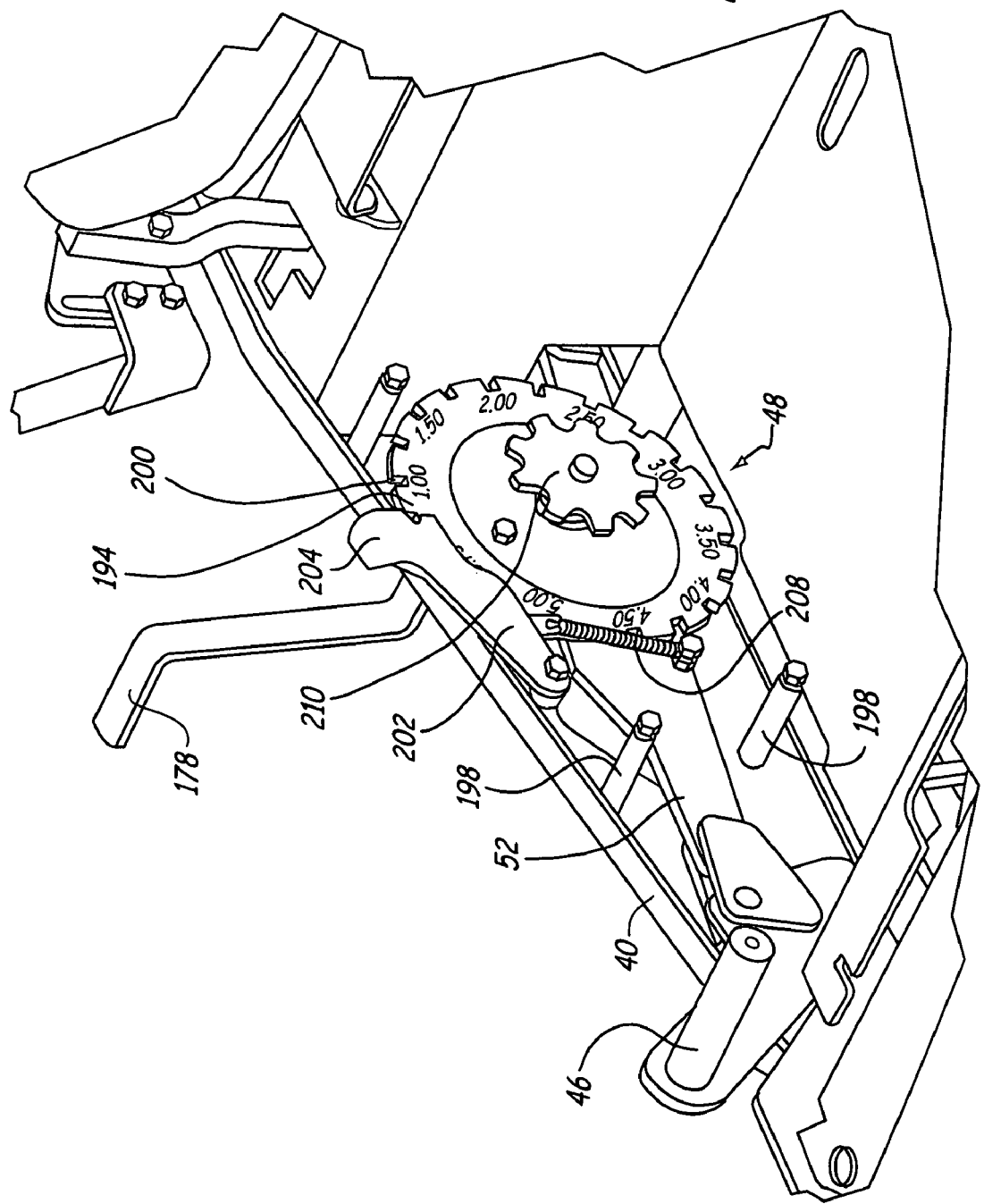

RIDING MOWER WITH DECK HEIGHT ADJUSTMENT

CROSS-REFERENCE TO RELATED APPLICATION(S)

Priority is claimed under U.S. Provisional Patent Application No. 60/488,028, entitled Riding Mower With Deck Height Adjustment, and filed on Jul. 17, 2003, which is incorporated herein by reference in its entirety.

BACKGROUND OF THE INVENTION

The present invention relates to riding mowers with mechanisms for adjusting the deck height, more particularly, a deck height adjustment that is easily operable while the operator is sitting on the riding mower.

Riding mowers are used for cutting grass or other vegetation. Riding mowers vary in both size and design, but commonly include one or more cutting blades that are carried in an enclosure called a deck. By adjusting the distance of the deck relative to the ground, also called deck height, the mowing length of the grass is varied.

There remains a continuing need in the art for a deck height adjustment that can be performed quickly, easily and accurately by an operator of a riding mower without the need to shut down the motor of the mower and/or to dismount the mower.

BRIEF SUMMARY OF THE INVENTION

An apparatus for adjusting the height of a mowing deck of a riding mower relative to a ground surface. The riding mower has a frame supporting an operator seating area and a deck lift system, where the mowing deck is supported by the deck lift system. The apparatus includes a lever, a moveable arm, and a cam wheel.

The lever is pivotally connected to a frame of the mower proximate the operator seating area. The moveable arm is operably connected between the lever and the deck lift system, and includes a shoulder between the lever and the deck lift system generally adjacent the operator seating area. The cam wheel is rotationally connected to the frame of the mower proximate the shoulder of the arm.

The cam wheel has an axis of rotation and an outer edge of varying radius relative to the axis or rotation. The shoulder contacts a portion of the outer edge when the lever is in a first position, and is spaced from the outer edge when the lever is in a second position. The mowing deck height above the ground surface is a function of the radius of the cam outer edge in contact with the shoulder.

BRIEF DESCRIPTION OF THE DRAWINGS

FIG. 8A is an enlarged perspective view of the deck height setting control of the riding mower of FIG. 1.

FIG. 8B is an enlarged perspective view of the deck height setting control of the riding mower of FIG. 8A with the mounting plate removed.

DETAILED DESCRIPTION

Figure 1:
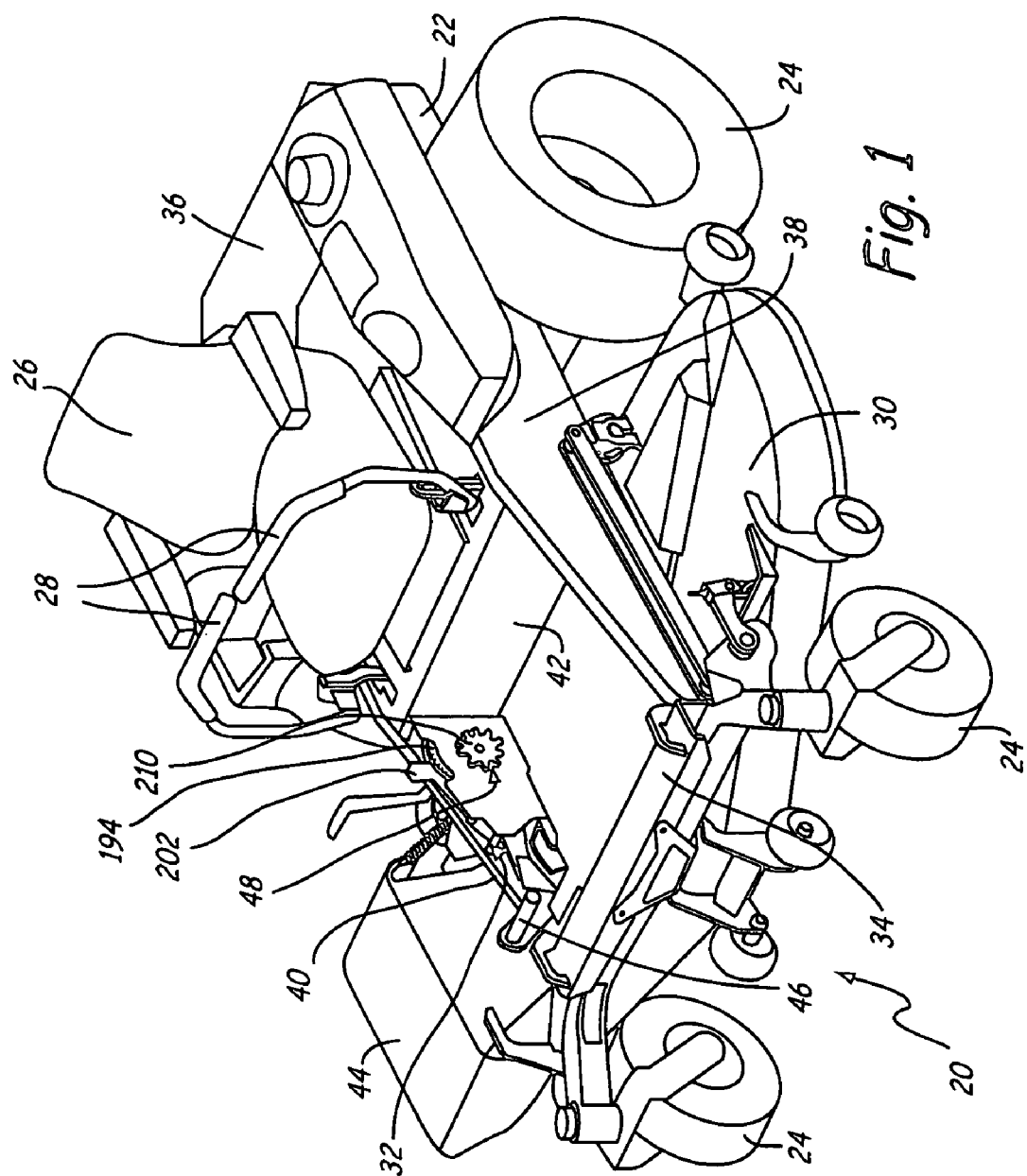
FIG. 1 is a perspective view of a riding mower with a deck height adjustment mechanism of the present invention.

FIG. 1 is a perspective view of a riding mower 20 incorporating a deck height adjustment mechanism of the present invention. Riding mower 20 generally includes metal frame 22, wheels 24, seat 26, steering controls 28, deck 30, and deck height adjustment assembly 32. Frame 22 includes a front frame member 34, a back frame member 36, a left frame member 38 and a right frame member 40, labeled as viewed from an operator's perspective sitting in seat 26. The left frame member 38 and right frame member 40 are generally parallel to each other and are each connected to front frame member 34 and back frame member 36 to form a support structure for front and rear axles for wheels 24 and for deck 30.

Connected between the left frame member 38 and the right frame member 40 is a support structure 42, which has an upper portion for supporting seat 26 and a lower portion for supporting the feet of the operator. Steering controls 28 are generally located adjacent to and forward of seat 26. Steering controls 28 pass through support structure 42 for connection to drive and steering systems (not shown) of riding mower 20.

Deck 30 is carried below frame 22 and is raised and lowered relative to the ground by deck height adjustment assembly 32. Deck 30 is generally carried in a horizontal relationship to the ground and a generally horizontal relationship to frame 22. Deck 30 includes one or more cutting blades (not shown) and a side discharge chute 44 through which clippings are expelled. Deck 30 is raised to a deck-up position when mowing is not desired, such as when riding mower 20 is being transported between locations or is being turned at the end of a cutting pass. An operator lowers deck 30 to a deck-down position for mowing.

Deck height adjustment assembly 32 is supported by frame 22 and generally includes a foot lever 46 that actuates a lifting mechanism for raising and lowering deck 30, and a deck height setting control 48 for variably selecting and maintaining the height of deck 30 relative to the ground. As shown in FIG. 1, in one embodiment deck height adjustment assembly 32 is located adjacent to and supported by right frame member 40 of frame 22. Deck height adjustment assembly 32 may alternatively be located adjacent to and supported by left frame member 38.

Figure 2:
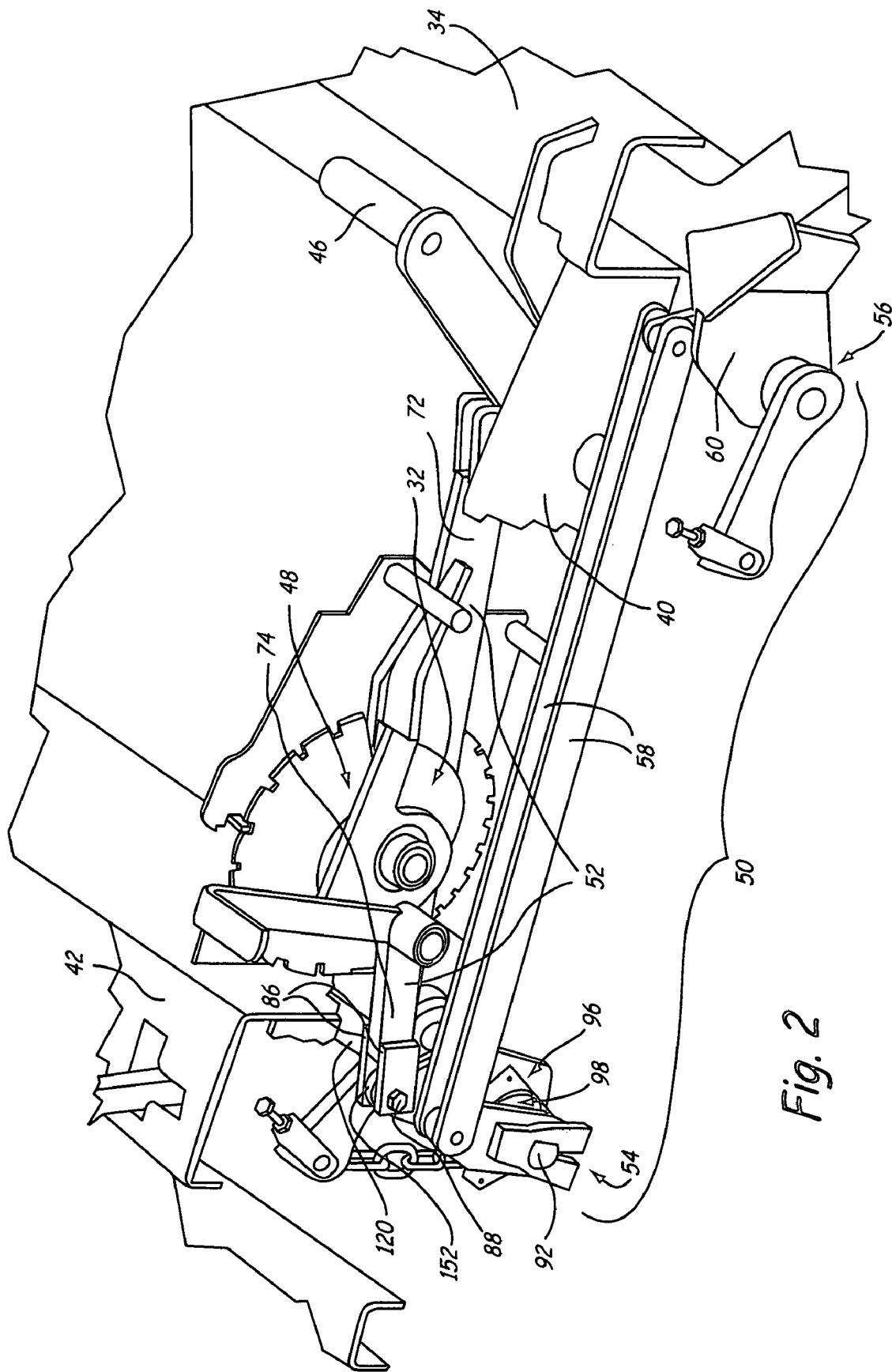
FIG. 2 is a perspective view of a portion of the deck height setting control mechanism relative to an exposed cut away view of a portion of a frame of a riding mower.

FIG. 2 is an enlarged partial perspective view of the right side of riding mower 20 with right frame member 40 partially cut away to expose further details of the deck height adjustment assembly 32. As shown in FIG. 2, foot lever 46 is connected to a deck lift assembly 50 (which is comprised of a rear shaft assembly 54, a front shaft assembly 56, and a pair of guide arms 58) by an arm 52. One end of arm 52 is connected to foot lever 46, which is itself pivotally mounted to right frame member 40. The other end of arm 52 is mounted to the rear shaft assembly 54. Pivotal movement of foot lever 46 causes a linear movement of arm 52 and, as will be described later in greater detail, a rotational movement of rear shaft assembly 54. Rear shaft assembly 54 is linked to front shaft assembly 56 via the pair of guide arms 58. Guide arms 58 ensure that pivotal movement of rear shaft assembly 54 is transferred to a coordinated rotational movement of front shaft assembly 56. The rotational movement of front shaft assembly 56 is made possible by a pivotal connection of front shaft assembly 56 to a mount piece 60 that is secured to the frame of riding mower 20.

Figure 3:
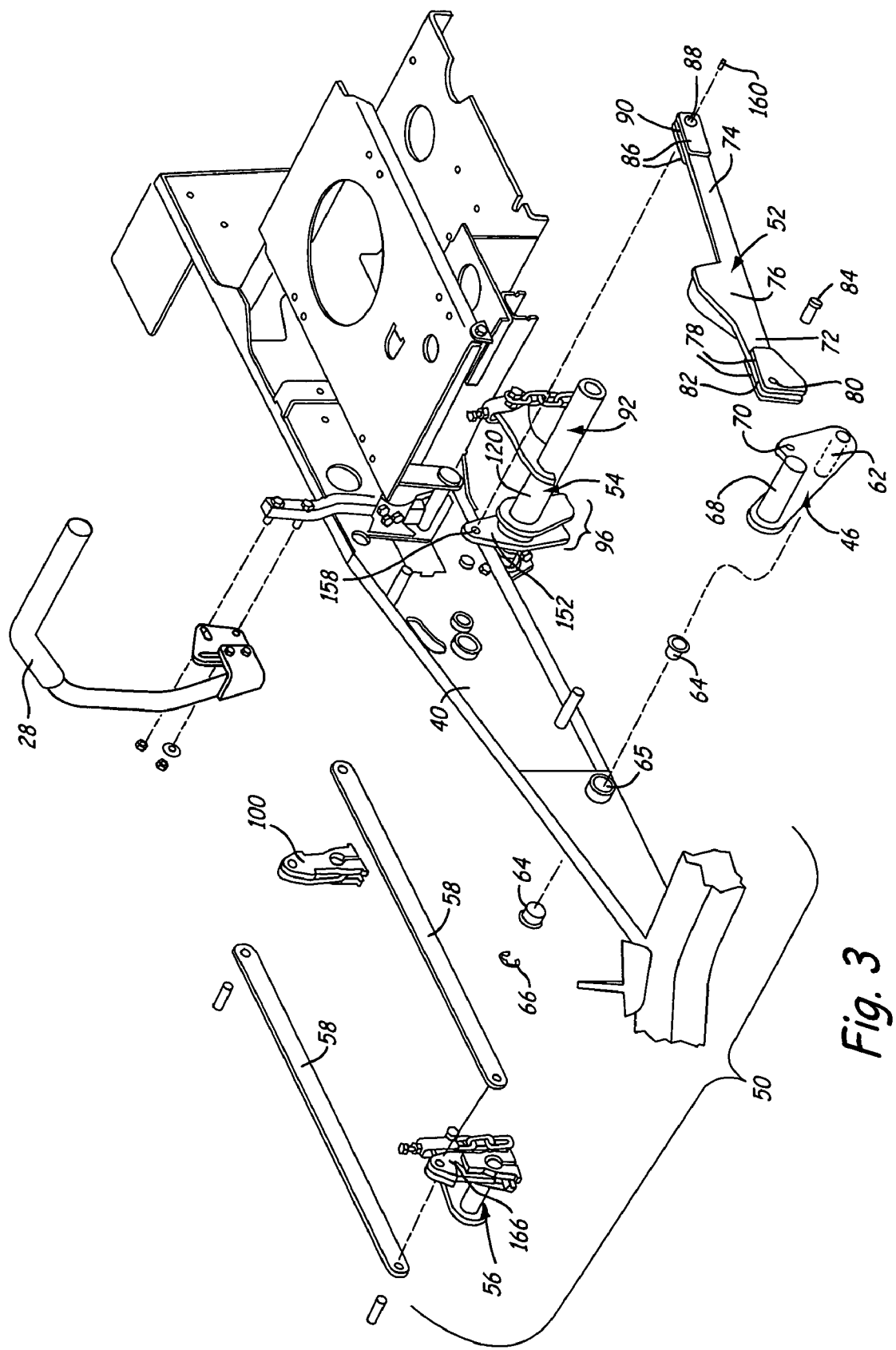
FIG. 3 is an exploded view of the deck height setting control mechanism relative to an exposed cut away view of a portion of a frame of a riding mower.

Additional detail of deck lift assembly 50 is shown in FIG. 3, which is an exploded view of a portion of deck height adjustment assembly 32 relative to right frame member 40. As shown in FIG. 3, foot lever 46 includes a peg 62 at one end that pivotally mounts within a pair of bushings 64 fit within hole 65 of right frame member 40. Peg 62 is retained within hole 65 by a C-clip 66. A pedal 68 is connected to the opposite end of foot lever 46 to allow an operator to actuate foot lever 46 by foot. Foot lever 46 is provided with opening 70 located between the opposing ends of foot lever 46, for attachment to arm 52.

Arm 52 is an elongate metal member that includes a first end 72, a second end 74, and an intermediate portion 76 that is wider than the first and second ends 72, 74. Attached to first end 72 on either side of arm 52 are a pair of flanges 78. Each flange 78 includes an opening 80. Flanges 78 define a slot 82 for receiving foot lever 46 such that opening 70 in foot lever 46 is aligned with openings 80 in the flanges 78. Pin 84 passes through openings 70 and 80 to pivotally link foot lever 46 to the first end 72 of arm 52.

Second end 74 also includes a pair of flanges 86 mounted on either side of arm 52. Each flange 86 includes an opening 88. Flanges 86 define a slot 90 for connecting second end 74 to rear shaft assembly 54.

Figure 4:
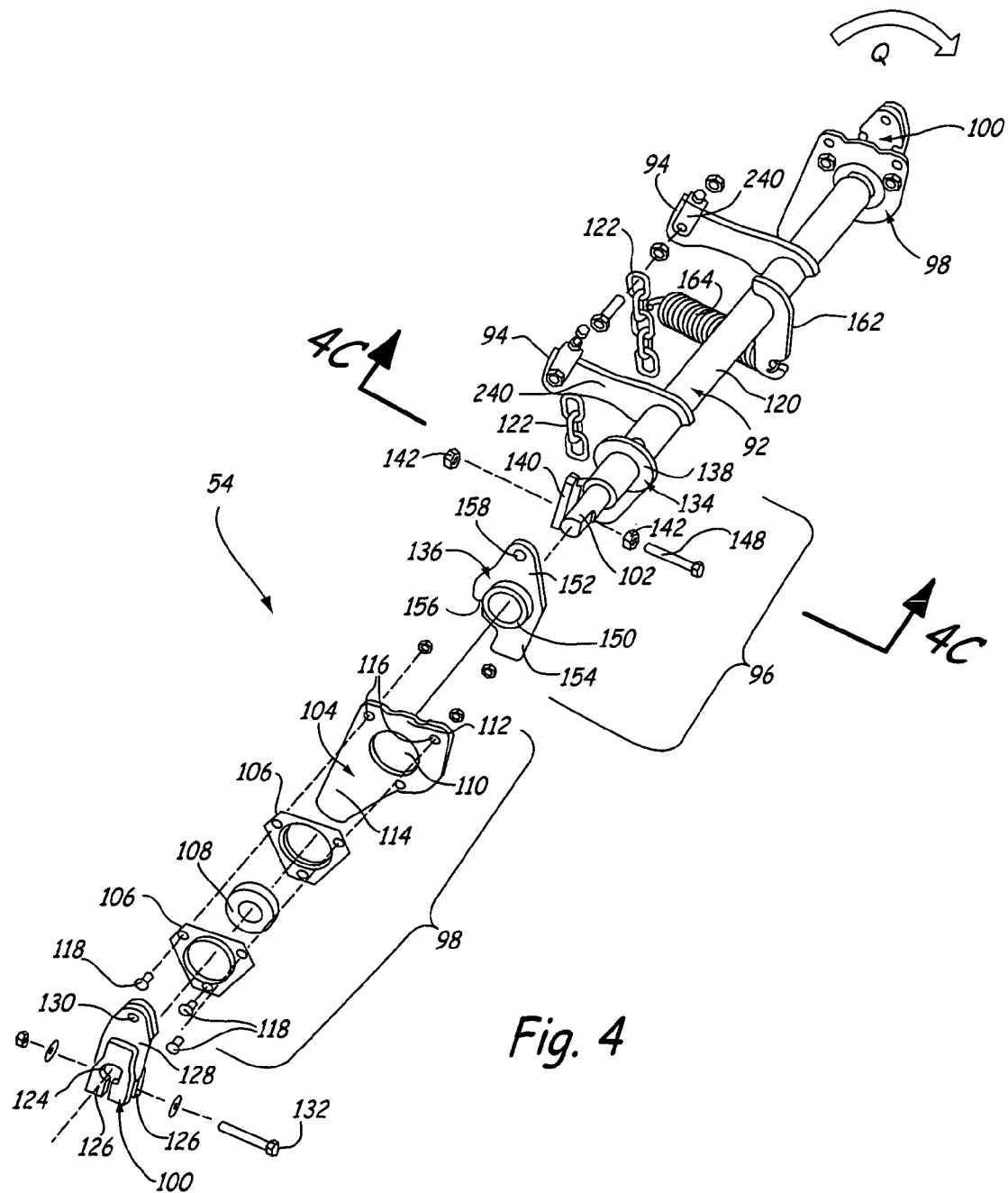
FIG. 4 is a partially exploded view of the rear shaft assembly of a deck lift mechanism of the riding mower.
Figure 4A:
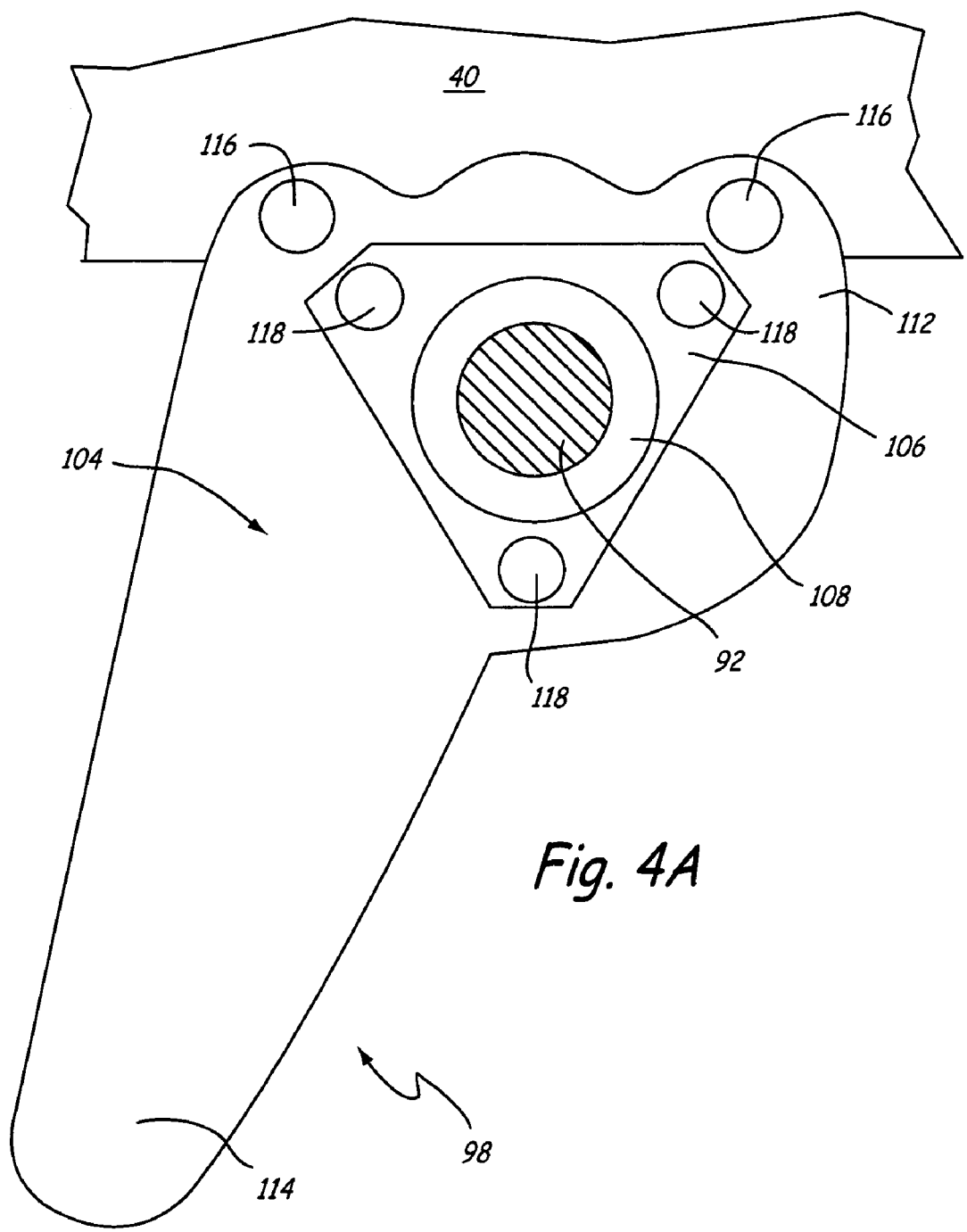
FIG. 4A is a side view of a shaft support attached to a frame member.
Figure 4B:
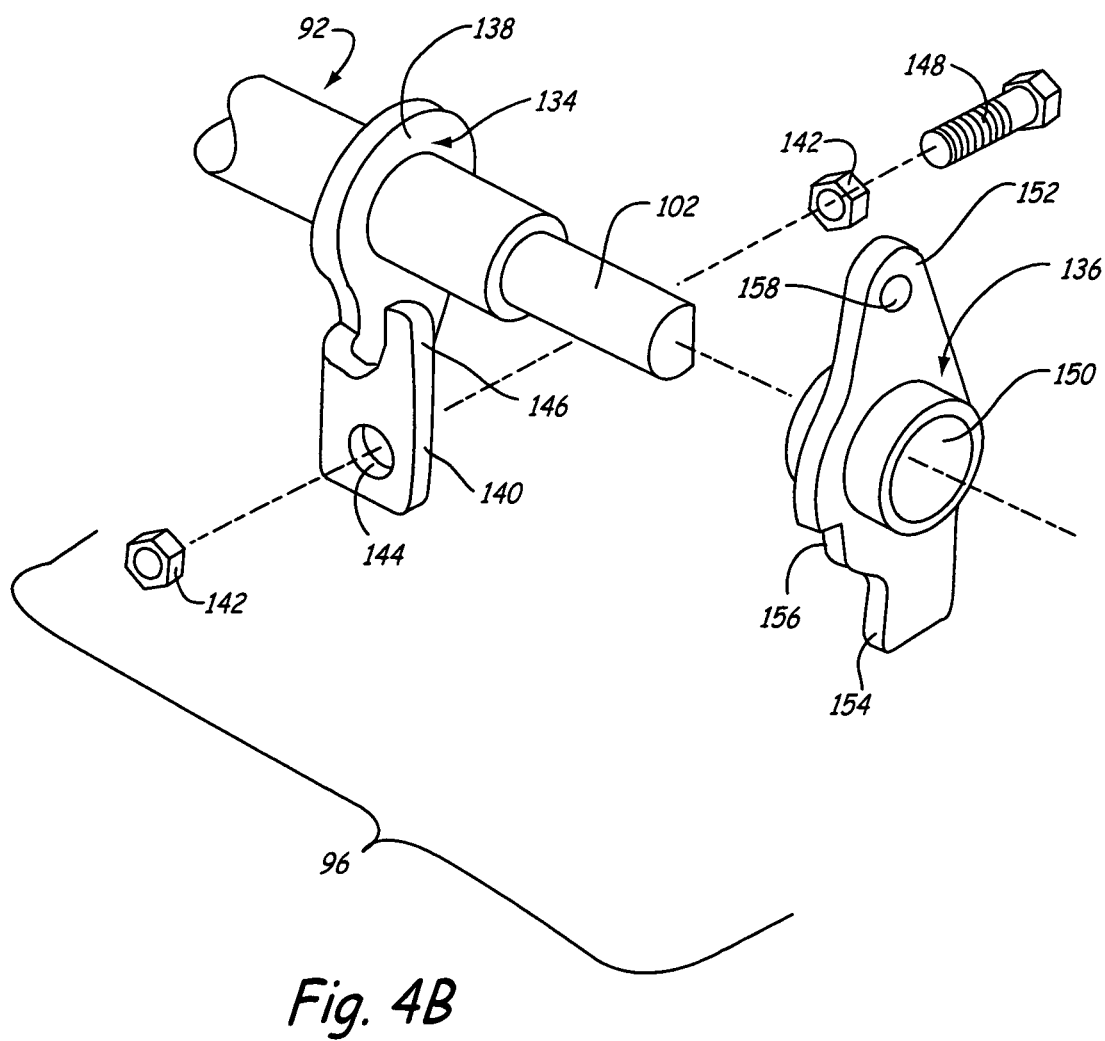
FIG. 4B is a partially exploded view of a deck height adjustment on the rear shaft assembly.
Figure 4C:
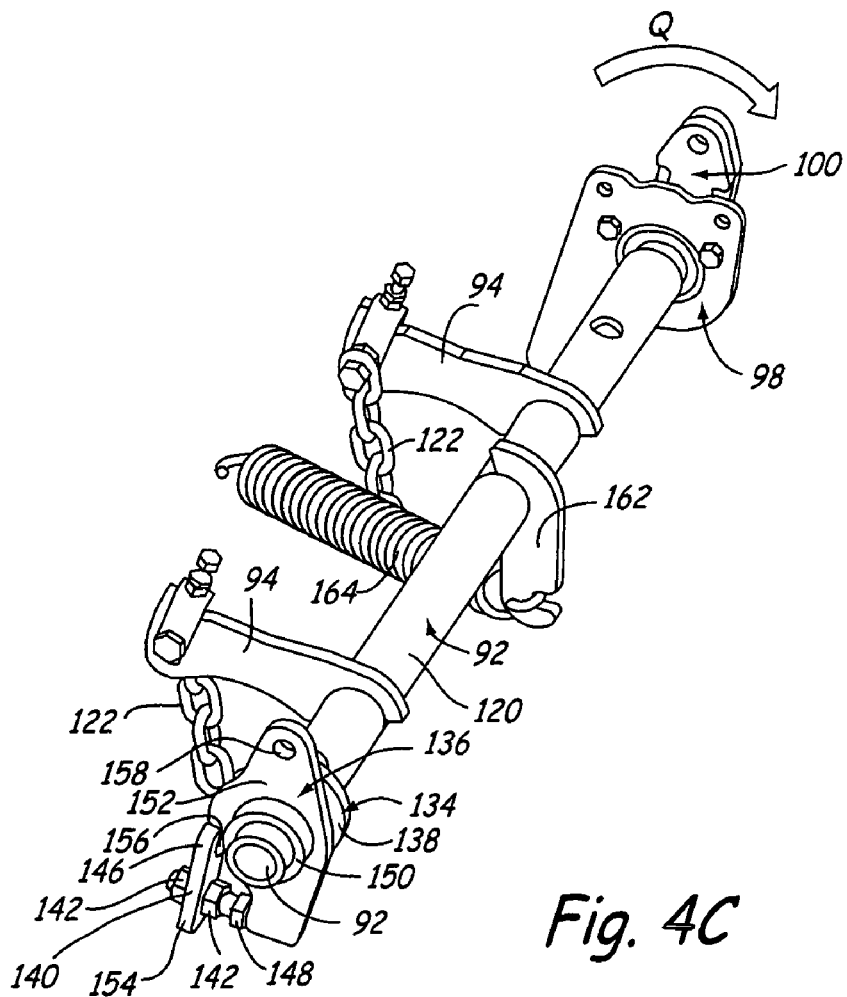
FIG. 4C is a partially sectioned perspective view of the rear shaft assembly of FIG. 4 taken along line 4C-4C.
Figure 4D:
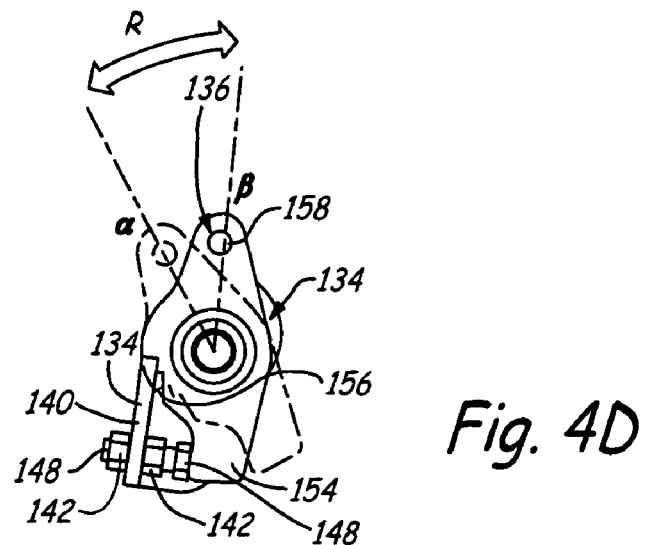
FIG. 4D is a side view of an inner ear assembly of the rear shaft assembly of FIG. 4C.

The rear shaft assembly 54 is shown in various perspective views in FIGS. 4 through 4D. FIG. 4 is a partially exploded view of rear shaft assembly 54. Rear shaft assembly 54 includes shaft 92, a pair of spaced lifting arms 94, inner ear assembly 96, supports 98 and pivot clamp 100. The rear shaft assembly 54 has a length greater than the width between left and right frame members 38 and 40 (not shown), such that a portion of shaft 92 extends beyond frame 22. As shown by the exploded right hand side of shaft 92 in FIG. 4, shaft 92 has end portions 102 of a reduced diameter that mount shaft 92 to the left and right frame members 38, 40 via supports 98.

Each support 98 consists of a mounting plate 104, a pair of bearing flanges 106 and radial ball bearing 108. Each mounting plate 104 has a P-like shape with a hole 110 through the upper portion 112 and an extended lower portion 114. The top of upper portion 112 has an upper scalloped edge with a plurality of holes 116 for mounting plate 104 to the outside lower edge of the left and right frame members 38 and 40, as shown in FIG. 4A. Hole 110 of mounting plate 104 aligns with a mated pair of bearing flanges 106 supporting radial ball bearing 108. Bearing flanges 106 are secured to the outer face of mounting plate 104 by a plurality of bolts 118. Radial ball bearing 108 is carried by bearing flanges 106 to allow slight misalignment of end portions 102 positioned through radial ball bearing 108. Lower portion 114 of mounting plate 104 extends below rear shaft assembly 54 to provide a stop for deck 30 as it is raised.

The pair of spaced lifting arms 94 are connected, such as by welding, to a central portion 120 of shaft 92. Lifting arms 94 extend in a direction about 90° counterclockwise relative to inner ear assembly 96 and pivot clamp 100. Lifting arms 94 provide a connection point for a chain 122, or other linking structure that in turn is connected to deck 30 (not shown). A clockwise rotation of shaft 92 results in a lifting moment that elevates the deck.

One side of each end portion 102 of shaft 92 is machined flat, which viewed on end gives end portions 102 a D-shaped appearance. This D-shaped section of end portion 102 mates to a complimentary D-shaped opening 124 in each pivot clamp 100, which provides a connection point for the pair of guide arms 58, as previously shown in FIG. 2.

Each pivot clamp 100 is comprised of two split flanges 126 welded on either side of an ear 128. Ear 128 is provided with an opening 130 for attaching to one end of the guide arms 58. Pivot clamp 100 attaches to the end portion 102 of shaft 92 adjacent to the outward face of support 98. A bolt assembly 132 passing between the two split flanges 126 secures pivot clamp 100 to the end portion 102 of shaft 92.

As shown in FIGS. 4 and 4B, inner ear assembly 96, which is positioned adjacent to the right side support 98, provides a connection point for the second end 74 of arm 52. Inner ear assembly 96 includes two adjacently placed, nested parts, referred to as a first member 134 and a second member 136. First member 134 has a ring-shaped upper portion 138 welded to shaft 92 and a tab 140 extending from the upper portion 138. Tab 140 includes an opening 144 through which a bolt 148 extends and is secured with a pair of nuts 142. Second member 136 has a bore 150 sized to slide over shaft 92, an ear 152 above bore 150, a wing 154 below bore 150 and a notch 156 that meshes with finger 146 of first member 134. Ear 152 is provided with a connection hole 158. Notch 156 of second member 136 meshes with finger 146 of first member 134 to hold second member 136 immediately adjacent to first member 134 (shown in FIG. 4C).

FIG. 4D is a cross-sectional view of shaft 92 that demonstrates the movement of second member 136 relative to first member 134. As shown in FIG. 4D, while first member 134 is mounted in a fixed position on shaft 92, second member 136 is able to rotate about shaft 92 as shown by arrow R. The clockwise rotation of second member 136 is limited by wing 154 biasing against the head of bolt 148. The counterclockwise rotation of second member 136 is limited by notch 156 biasing against tab 140. The radial position of second member 136 relative to first member 134 (and thereby shaft 92) at the limit of clockwise rotation (when second member 136 biases against the head of a bolt 148) is adjusted by changing the distance bolt 148 penetrates nuts 142. The adjustment of bolt 148 serves as a means to make fine adjustments to the deck height setting control 48.

Inner ear assembly 96 is connected to and extends from central portion 120 of shaft 92 near right frame member such that ear 152 aligns with arm 52, as shown in FIG. 2 and indicated in the exploded view of FIG. 3. Ear 152 of inner ear assembly 96 fits within slot 90 of flanges 86 with connection hole 158 in alignment with openings 88 of flanges 86. A pin 160, for example a lynchpin with a securing cotter pin links inner ear assembly 96 to the second end 74 of arm 52.

Figure 5:
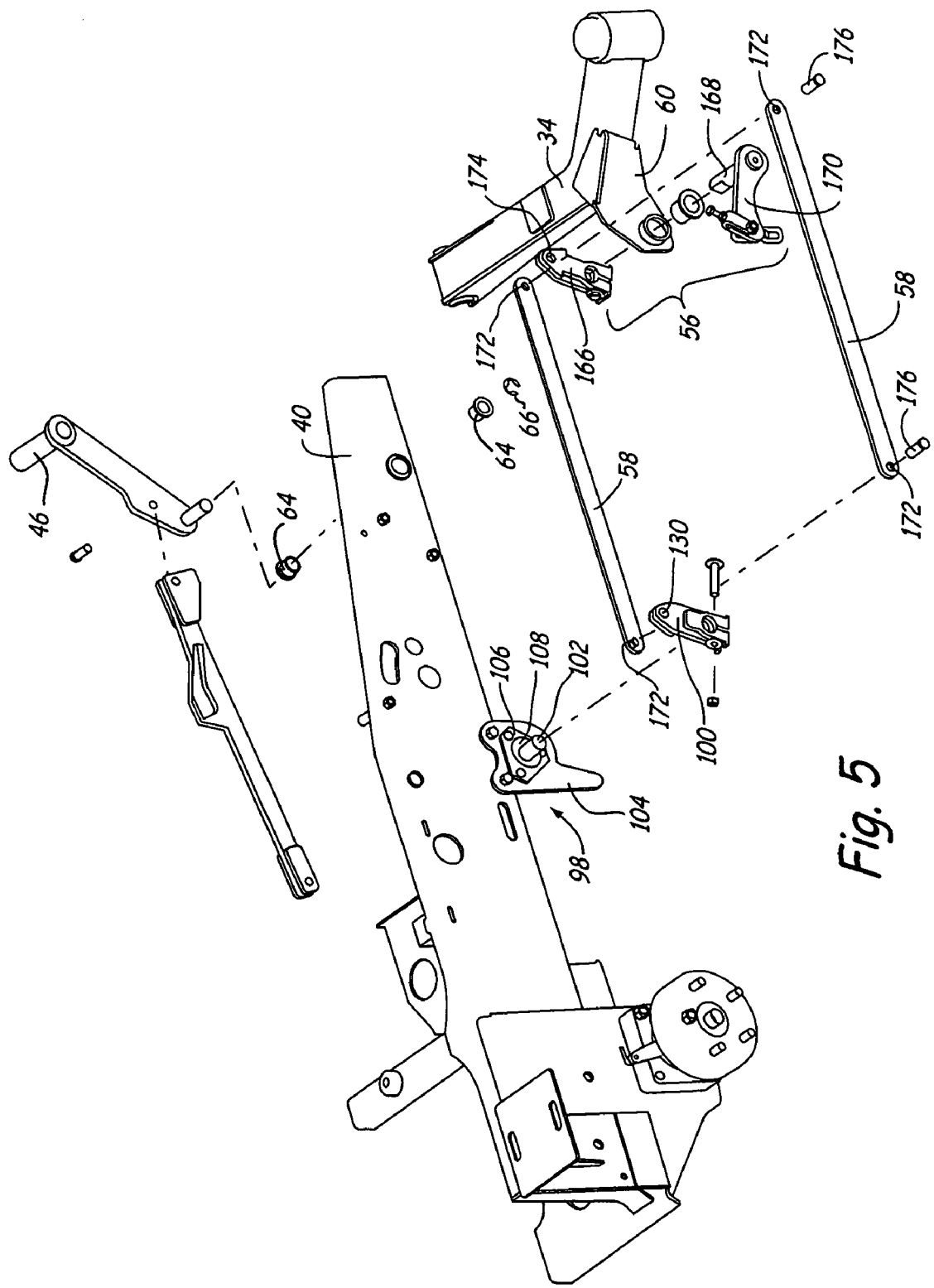
FIG. 5 is an exploded view of the interconnection of the rear shaft assembly with the front shaft assembly.

A clip 162 is welded at a central location on central portion 120 of shaft 92 as shown in FIGS. 4 and 4C. Clip 162 hooks to a heavy spring 164 that in turn links to frame 22 (not shown). Clip 162 and heavy spring 164 biases shaft 92 to rotate in direction Q to assist the operator in lifting deck 30, as shown in FIG. 4C. FIG. 5 is an exploded view of the interconnection of rear shaft assembly 54 to a front shaft assembly 56 that is mounted on each side of riding mower 20, shown adjacent to right frame member 40. Front shaft assembly 56 includes a pivot clamp 166, a shaft 168 and an arm 170. Pivot clamp 166 is typically identical to pivot clamp 100 associated with rear shaft assembly 54. Pivot clamp 166 is mounted to one end of shaft 168 in the manner previously described relative to pivot clamp 100 so that pivot clamp 166 and pivot clamp 100 have a similar orientation. Shaft 168 is rotationally mounted to mount piece 60, of front frame member 34. Attached to the other end of shaft 168 is arm 170, which is oriented 90° counterclockwise relative to pivot clamp 166 so that arms 170 have a similar orientation to lifting arms 94 of shaft 92.

A pair of guide arms 58 include openings 172 at each end for connection to the openings 130 and 174, respectively, of pivot clamp 100 and pivot clamp 166 via pins 176.

Figure 6:
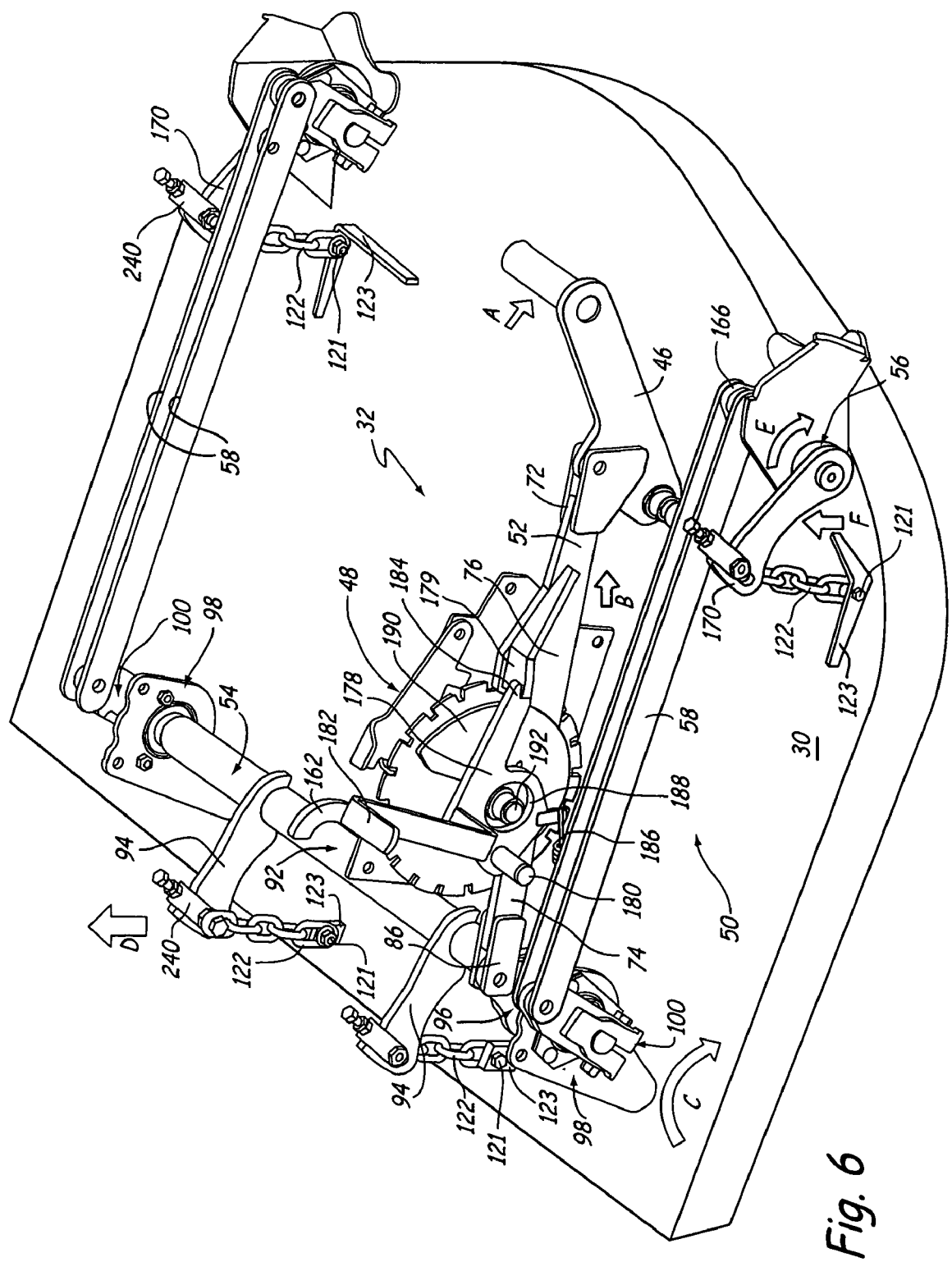
FIG. 6 is a perspective view of the deck height setting control mechanism when the deck is in a deck-up position and the frame of the riding mower removed.

The general operation of deck lift assembly 50 is depicted in FIG. 6. Deck 30 is raised by a pivotal movement of foot lever 46 in a forward direction, as shown by arrow A. As foot lever 46 pivots forward, arm 52 attached to foot lever 46 at first end 72 is also pulled forward in the direction shown by arrow B. The second end 74 of arm 52 is attached to inner ear assembly 96 such that the forward movement of arm 52 in the direction of arrow B likewise causes forward displacement of inner ear assembly 96, and a clockwise rotation of shaft 92, as shown by arrow C. The clockwise rotation of shaft 92 causes an elevation of lifting arms 94, as shown by arrow D. The elevation of lifting arms 94, which are attached to the rear of deck 30 by chains 122, increases the height of deck 30 above the ground. Deck 30 attaches to chains 122 by a tab 123 having a hole, the tab being welded to deck 30 at the locations for chain attachment. A connector 121 secures the lower end of each chain 122 or other flexible linker to tab 123, for example, by a bolt passing through the hole in tab 123, and chain 122.

The clockwise rotation of shaft 92 also rotates pivot clamp 100 clockwise, which causes a forward movement of guide arms 58 in the direction of arrow B. Guide arms 58 in turn cause a clockwise rotation of pivot clamp 166 and front shaft assemblies 56 (arrow E) and a lifting of arm 170 in the direction of arrow F. As arm 170 travels in the direction of arrow F, the front of deck 30 is raised an amount equal to the rear of deck 30. The coordinated rotation of lifting arms 94 and lifting arms 170 also provides a uniform amount of displacement of deck 30 thereby raising deck 30 in a generally uniform manner to the deck-up position. Deck 30 is lowered by reversing the direction of movement of foot lever 46.

Deck lift assembly 50 is shown in FIG. 6 secured in the deck-up position. Deck 30 is secured in a deck-up position by a transport lock 178 that is pivotally mounted to right frame member 40 (not shown) by a peg 180. Transport lock 178 includes a handle 182, finger 184, spring 186, and opening 188. Opening 188 allows transport lock 178 to rotate without interference of axle 192 of the deck height setting control 48. The finger 184 of transport lock 178 includes a stepped inner front surface that mates with a shoulder 179 that is secured to intermediate portion 76 of arm 52 to prevent rearward movement of arm 52 when deck 30 is at near maximum deck height. Spring 186 is attached between the transport lock 178 and right frame member 40 (not shown) to bias finger 184 against shoulder 179 and secure transport lock 178 in a locked position. As arm 52 is moved in the direction of arrow B a sufficient distance, finger 184 of transport lock 178 engages shoulder 179 as shown in FIG. 6 thereby preventing rearward movement of arm 52. Foot lever 46 is then released by the operator and arm 52 at shoulder 179 biases against transport lock 178 such that deck 30 is "locked" in the deck-up position.

Figure 7:
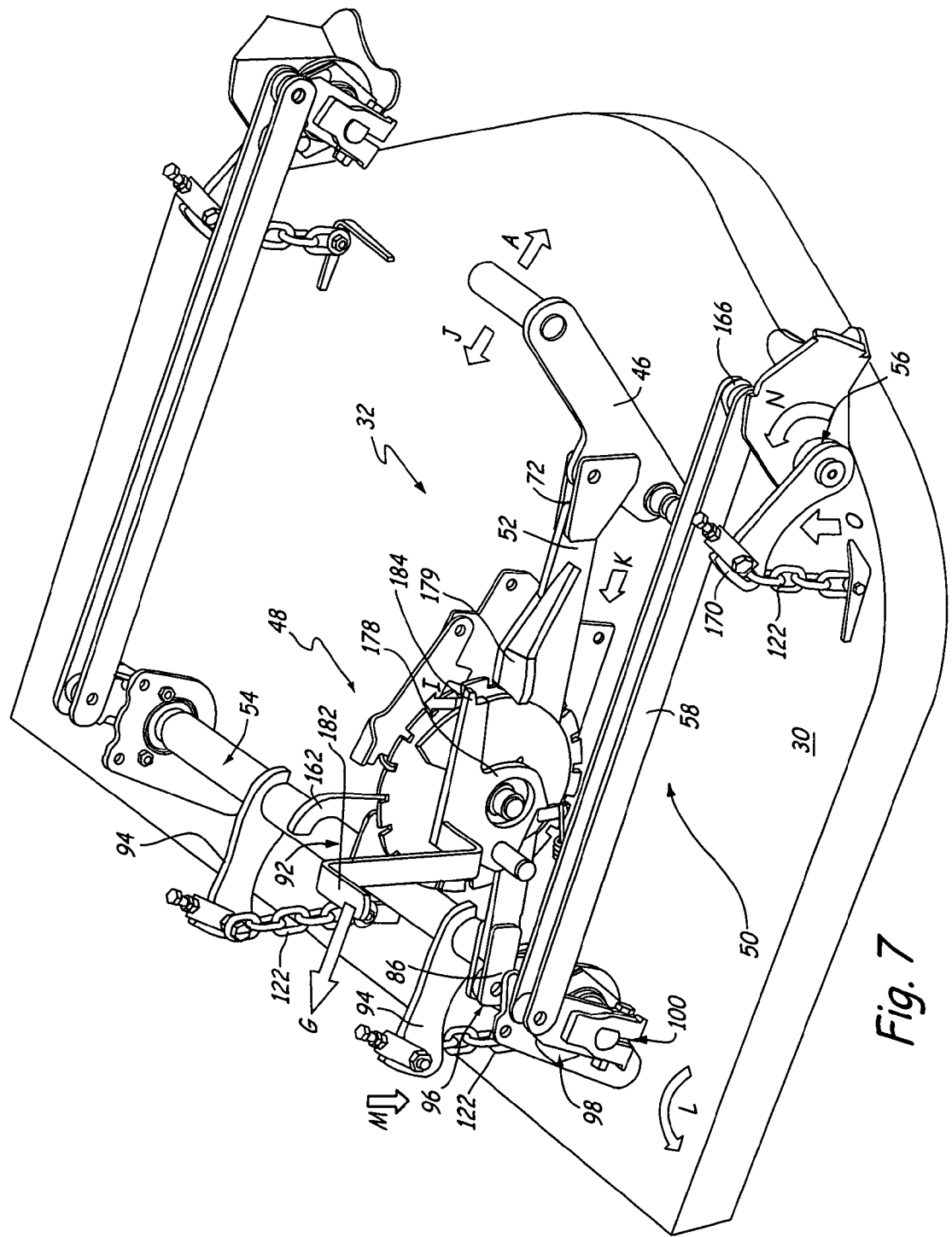
FIG. 7 is a perspective view of the deck height setting control mechanism when the deck is in a deck-down position and the frame of the riding mower removed.

To lower deck 30 from the deck-up position, the deck lift assembly 50 must be unlocked, as shown in FIG. 7. To release the transport lock 178, foot lever 46 is pressed by the operator in the direction of arrow A while the operator simultaneously pulls rearward in the direction of arrow G on handle 182 of the transport lock 178 thereby raising finger 184 (arrow I) and disengaging finger 184 from shoulder 179. After the transport lock 178 is released, the deck 30 may be lowered by the operator by releasing foot lever 46 in the direction of arrow J (by removing the force applied to foot lever 46). As foot lever 46 pivots backward, arm 52 attached to foot lever 46 at first end 72 is also moved in the direction shown by arrow K, thereby reversing the direction of the deck lift assembly 50 and lowering deck 30.

Figure 8:
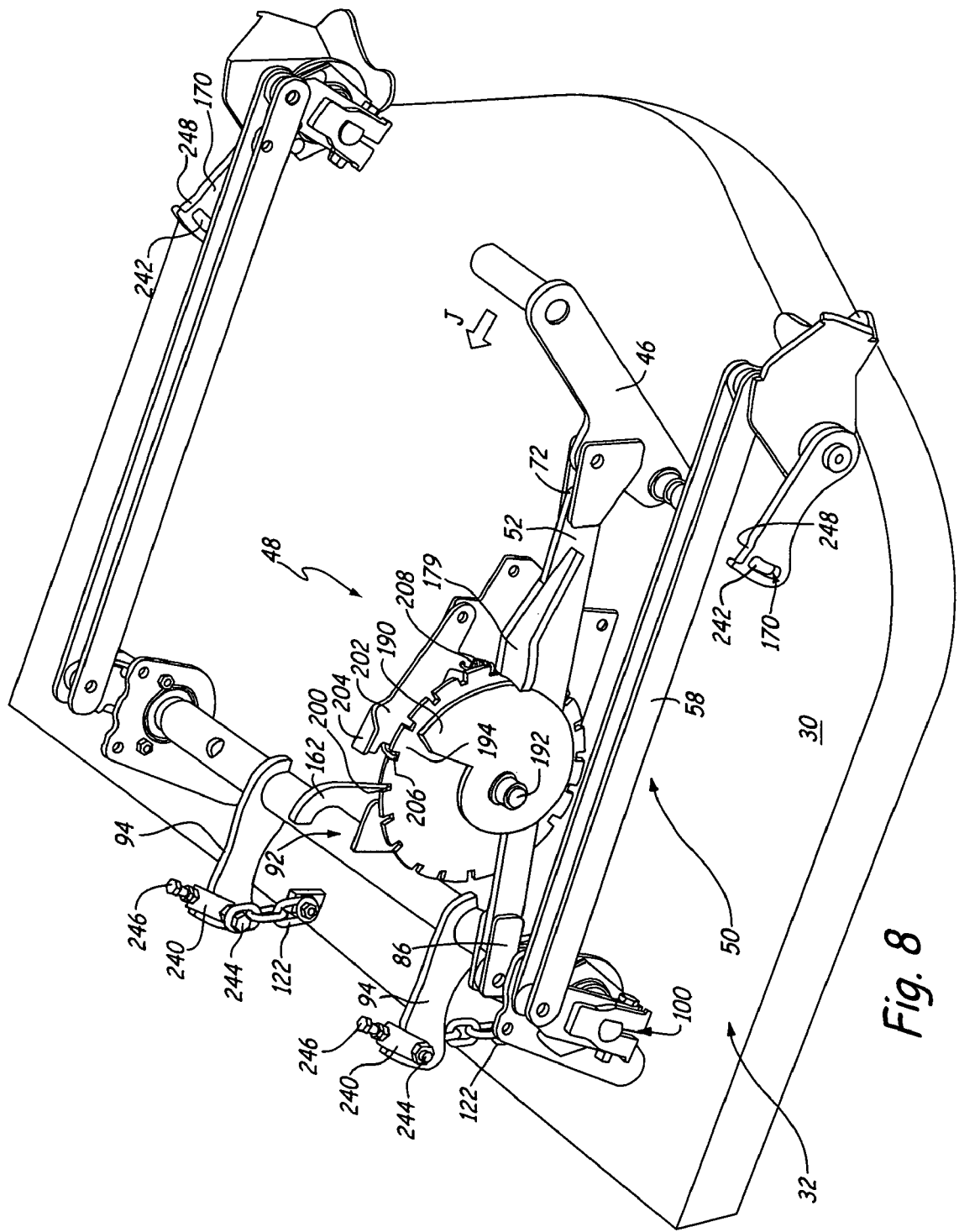
FIG. 8 is a perspective view of the deck height adjustment assembly when the deck is in a deck-down position with the transport lock removed.

The range of travel of arm 52, which is controlled by the deck height setting control 48, determines the deck height of deck 30. As shown in FIG. 8, the deck height setting control 48 includes a cam wheel 190 that is mounted on an axle 192 of a selector wheel 194. Cam wheel 190 is spaced from selector wheel 194 to accommodate arm 52. Cam wheel 190 has an outer perimeter edge of a varying radius relative to axle 192. The perimeter edge of cam wheel 190 is aligned to contact the shoulder 179 connected to arm 52 and thereby fix the position of the deck lift assembly 50. As shown in FIGS. 8 and 8A, the selector wheel 194 and cam wheel 190 are mounted between right frame member 40 and a mounting plate 196 that is secured to right frame member 40 by spaced connections 198.

The outer radial edge of selector wheel 194 of the deck height setting control 48 includes a plurality of radially spaced grooves 200 of a predetermined radial spacing. The position of selector wheel 194 and cam wheel 190 is selected and maintained by a latch 202 that is pivotally connected to mounting plate 196. Holes provided at one end of latch 202 and in mounting plate 196 receive a bolt 203 to form this pivotal connection. The other end of latch 202 includes a lip 204 and a finger 206 that is dimensioned to fit into the grooves of selector wheel 194. A spring 208 connected to a lower portion of latch 202 connects to the mounting plate 196 to radially bias the finger 206 of latch 202 within a selected groove 200 of the selector wheel.

As shown in FIGS. 8A and 8B, the face of the selector wheel 194 viewed by the operator is provided with numbers that correspond to each of the various radially spaced grooves 200. The numbers are indicative of the deck height that is obtained when latch 202 engages a particular groove of the selector wheel. The selector wheel is provided with a dial 210 attached to axle 192 to enable the operator to rotate selector wheel 194 to a desired deck height setting, once finger 206 of latch 202 disengages groove 200 when the operator pulls up on lip 204.

Figure 9:
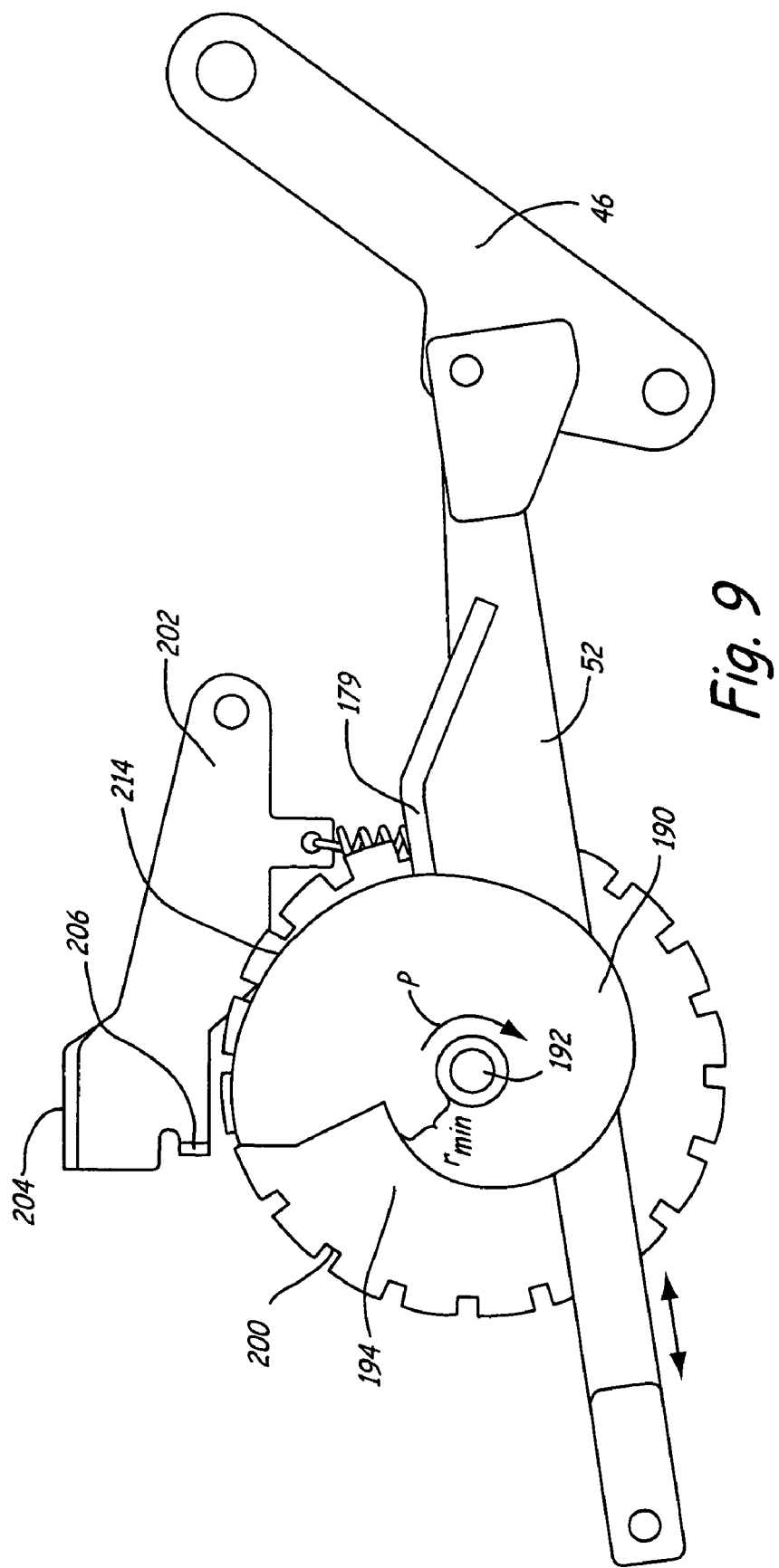
FIG. 9 is a side view of the deck height adjustment assembly of the present invention with the cam wheel in a first position.
Figure 10:
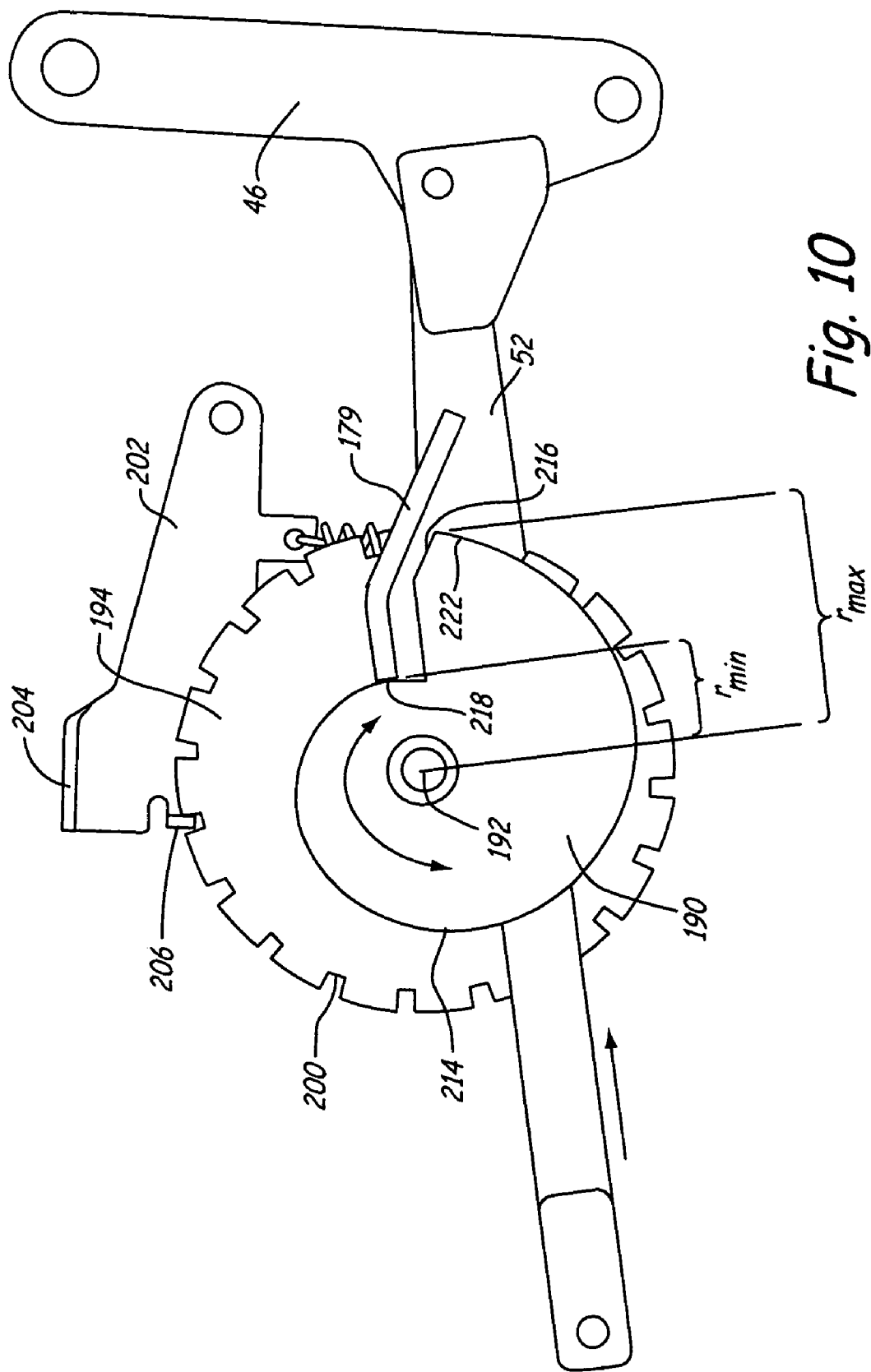
FIG. 10 is a side view of deck height adjustment assembly with the cam wheel in a second position.

FIGS. 9 and 10 are diagrammatic views of the operation of the deck height setting control 48 with shoulder 179 of arm 52. As shown in FIG. 9, cam wheel 190 has a variable radius measured from axle 192 to outer edge 214. The deck height is adjusted by rotation of cam wheel 190 such that a portion of outer edge 214 of a desired radius is presented to engage shoulder 179. As shown in FIG. 9, rotating cam wheel 190 clockwise (arrow P) relative to shoulder 179 results in an increase of the radius r of outer edge 214 relative to $r_{min}$. As the radius r of outer edge 214 presented for engagement with shoulder 179 increases, the deck height increases when shoulder 179 engages outer edge 214. Conversely, as shown in FIG. 10, as the radius r of outer edge 214 presented for engagement with shoulder 179 decreases, the deck height decreases when shoulder 179 engages outer edge 214. At the position of cam wheel 190 and arm 52 shown in FIG. 10, deck 30 (not shown) is at the lowest deck height. Cam wheel 190 includes a stop edge surface 216 that is formed to engage a lower surface of shoulder 179 to prevent over-rotation of selector wheel 194.

As described above, the circumference of cam wheel 190 varies in radius relative to axle 192 within a range corresponding to the desired range of deck heights for riding mower 20. The distribution of radii of cam wheel 190 from a minimum radius $r_{min}$ to a maximum radius $r_{max}$ provides a range of linear displacement for arm 52 that coincides with a range of available deck heights. The minimum and maximum radii need not be limited to specific values as it is the relative change in radius of the cam wheel 190 that controls the amount of displacement of arm 52. The distribution of radii of the cam wheel will typically span several inches to accommodate a suitable range of deck heights. For example, a range of deck heights from approximately 0.5 inches to approximately 6.5 inches for regular lawn mowing, will require a distribution of radii to span 6.0 inches. For example, a suitable cam wheel 190 has a minimum radius at approximately 1.0 inch at a first portion 218 of outer edge 214 to a maximum radius of approximately 7.0 inches at a second portion 222 of outer edge 214.

The distribution of radii (i.e., the difference between the maximum and minimum radii) for cam wheel 190 is limited only by the size of cam wheel 190. The range of deck heights and therefore the distribution of radii of the cam may be broadened or narrowed as desired for various riding mowers. The distribution is preferably at least 4 inches to approximately 12 inches. A preferred distribution is approximately 6 inches. Additionally, the number and distribution of grooves 200 on selector wheel 194 may readily be varied to increase or decrease the number of deck heights that may be selected.

To coordinate the distribution of radii of cam wheel 190 with a particular range of deck heights, the riding mower 20 is calibrated when the deck 30 is attached. The deck 30 is commonly attached to lifting arms 94 and lifting arms 170 by an adjustable attachment means, such as chains 122. To calibrate the deck height with the deck height assembly 32, the deck 30 is attached to the deck height adjustment assembly 32 at the deck height corresponding to the current setting of cam wheel 190 at the time of attachment. For example, a riding mower 20 has a cam wheel 190 with a difference between maximum and minimum radii of 5 inches and a desired minimum deck height is 0.5 inch. First, setting of the cam wheel 190 is adjusted to the minimum radius such as seen in FIG. 7 and subsequently installing deck 30 at a height approximately 0.5 inches above the ground. The result is cam wheel 190 and deck height are properly coordinated such that a deck height range from 0.5 inch to 5.5 inches is achieved. If alternatively, the deck is installed at approximately 1 inch above the ground at the minimum setting of cam wheel 190, then the resulting range of deck heights is from 1 to 6 inches.

After the deck 30 is attached to riding mower 20, the height of the deck may be fine tuned to more accurately match the reading on selector wheel 194 by adjusting the relative position of the first member 134 and second member 136 of inner ear assembly 96 (shown in FIG. 4D). The deck 30 is slightly raised by rotating bolt 148 counterclockwise such that the angle θ between an axis a through first member 134 and an axis β through second member 136 is increased. Rotating bolt 148 clockwise decreases angle θ thereby slightly lowering the position of deck 30 in the deck-down position.

The deck height may also be fine tuned by an adjustable connector 240 (shown in FIG. 8) that attaches chains 122 to lifting arms 94 and lifting arms 170. Each lifting arm 94 and 170 includes a slot 242 for securing connector 240 and chain 122 by bolt assembly 244 to each lifting arm. Connectors 240 include a bolt adjustment 246. The vertical position of joint 240 and chain 122 relative to slot 242 is adjusted by rotating bolt adjustment 246 that biases against a recess 248 in the upper edge of lifting arms 94 and 170. Deck 30 is slightly raised by clockwise rotation of bolt adjustment 246 and slightly lowered by a counterclockwise rotation of bolt adjustment 246.

In summary an operator raises and lowers deck 30 by depressing and releasing foot lever 46 with his foot. Deck 30 is raised to a deck-up position wherein deck 30 is in the closest position relative to frame 22 and the farthest from ground and is secured in the deck-up position by transport lock 178. An operator lowers deck 30 by releasing transport lock 178 if it has been engaged, and gradually applying less force to foot lever 46 such that foot lever 46 moves rearward towards the operator. Deck 30 is lowered to a deck-down position wherein deck 30 is closest to the ground and farthest from frame 22. The distance between deck 30 and the ground when deck 30 is in the deck-down is referred to as the deck height. Deck 30 is lowered to the deck-down position for mowing and deck height corresponds to the resulting height of the mown vegetation.

An operator adjusts the deck height to from one setting to another by raising deck 30 to approximately the deck-up position. Raising the deck 30 by depressing foot lever 46 displaces shoulder 179 to allow unimpeded rotation of cam wheel 190. Next, an operator lifts latch 202 upward until finger 206 is removed from groove 200. Then, cam wheel 190 and selector wheel 194 are rotated in concert by turning dial 210 with his other hand. When the selector wheel 194 displays the selected deck height, latch 202 is released allowing finger 206 to engage the corresponding groove 200. The deck 30 is lowered to that height by releasing foot lever 46.

Figure 11:
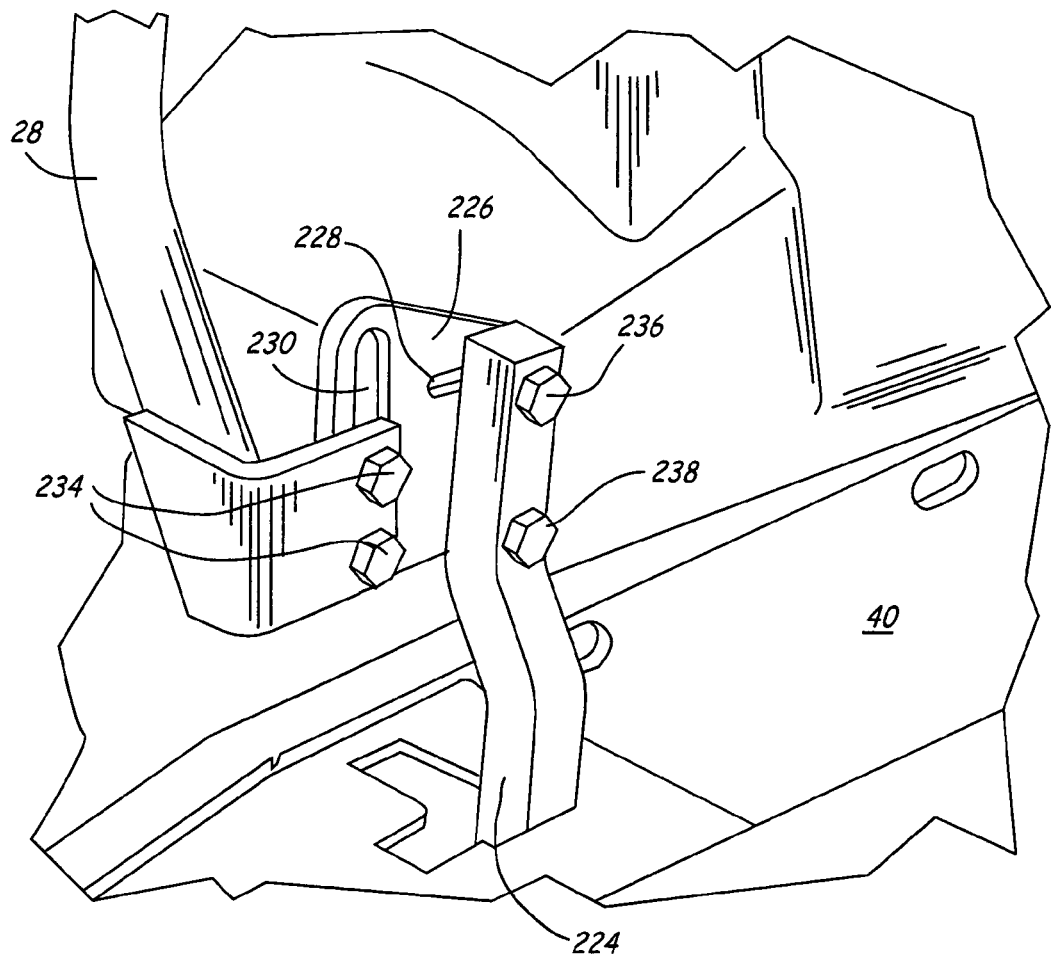
FIG. 11 is an enlarged perspective view of the steering control connection to the riding mower of the present invention.
Figure 12:
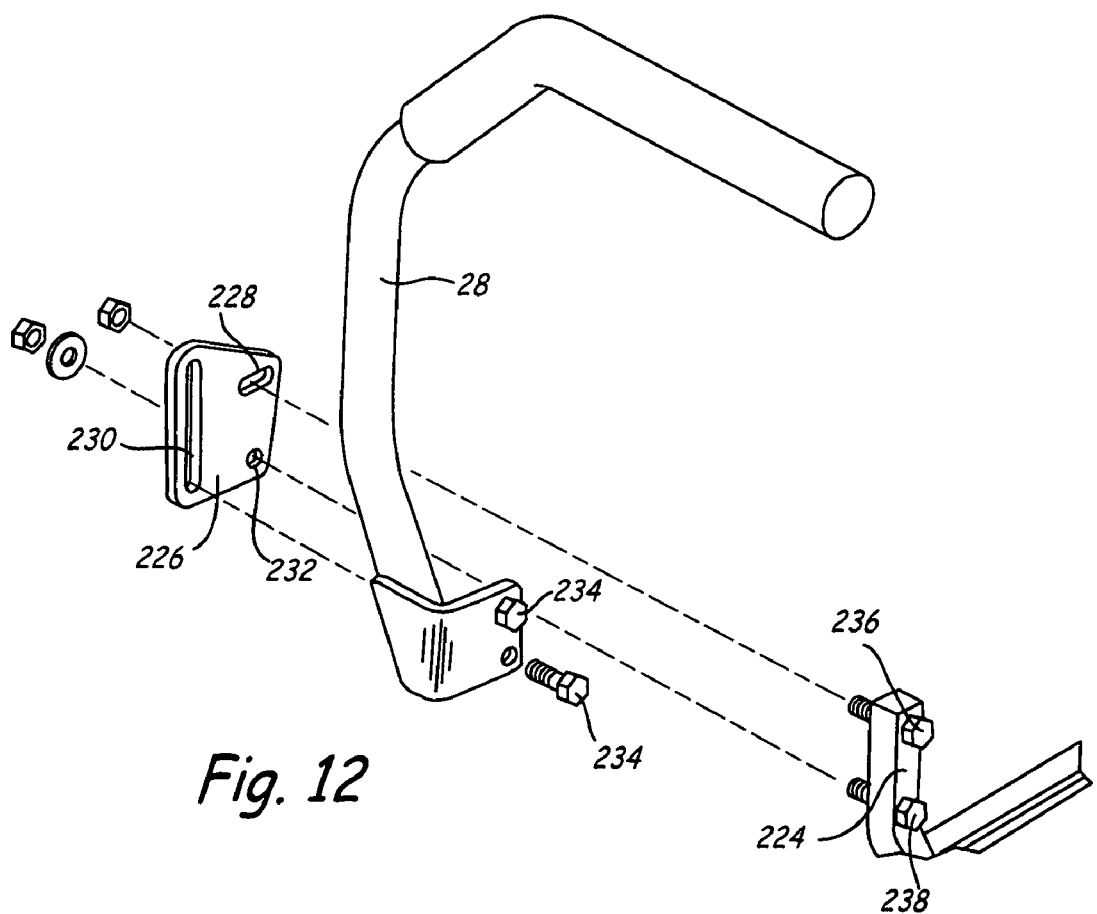
FIG. 12 is an exploded view of the steering control connection to the riding mower of the present invention.

An additional beneficial feature of riding mower 20, shown in FIG. 11, is the pair of dual adjustable steering controls 28 to provide both vertical and front/back position adjustment. Steering controls 28 are attached to control arms 224 by bracket 226. Control arms 224 select the drive speed and direction of wheels 24 (not shown). Bracket 226, additionally shown in greater detail in FIG. 12, includes a horizontal opening 228, a vertical slot 230, and a fixed attachment hole 232. Each steering control 28 is secured to vertical slot 230 of bracket 226 by bolts 234. Vertical slot 230 allows steering controls 28 to be adjusted vertically according to the operator's size or preference before tightening down the bolts 234 to fix the position of the steering controls 28. Horizontal opening 228 and fixed attachment hole 232 secure bracket 226 to its respective control arm 224. Bracket 226 is pivotally attached to control arm 224 at the fixed attachment hole 232 with bolt 236. The second connection made with bolt 238 through horizontal opening 228 limits the pivoting of bracket 226 to a defined range. Steering controls 28 and brackets 226 are pivoted either forward or backward to a desired position, with the bolts 236 and 238 then being tightened to secure the desired position of the steering controls 28.

The riding mower of the present invention includes a deck height adjustment that can be performed quickly, easily and accurately by an operator of a riding mower without requiring powering down the mower and/or exiting the mower. Additionally the deck height adjustment assembly is flexible, such the deck is able to "bump-up" over obstacles or terrain the deck may encounter during mowing and thereby avoid damage. Multiple deck height settings are available to an operator at the turn of a dial and readily locked in place. A foot pedal takes advantage of increased muscle strength generally available in an operator's leg versus an arm or hand control for raising and lowering heavy mower decks, especially on commercial scale riding mowers. The parts of deck height adjustment assembly 32 and riding mower 20 are generally constructed of a metal material with sufficient strength capable of operating and supporting the decks, which weigh approximately 250 pounds.

Although the present invention has been described with reference to preferred embodiments, workers skilled in the art will recognize that changes may be made in form and detail without departing from the spirit and scope of the invention.

The invention claimed is:

1. A riding mower having an apparatus for adjusting the height of a mowing deck relative to a ground surface, the riding mower having a frame supporting an operator seating area and a deck lift system, wherein the mowing deck is supported by the deck lift system, the apparatus comprising:
    a lever pivotally connected to the frame of the mower proximate the operator seating area;
    a moveable arm having a first end pivotally connected to the lever and a second end, opposite the first end, operably connected to the deck lift system, the arm comprising a shoulder between the first end and the second end generally adjacent the operator seating area, wherein the shoulder connects to and extends generally normal to the arm; and
    a cam wheel rotationally connected to the frame of the mower proximate the shoulder of the arm, the cam wheel having an axis of rotation and an outer edge of varying radius relative to the axis of rotation, wherein the shoulder contacts a portion of the outer edge when the lever is in a first position, the shoulder is spaced from the outer edge when the lever is in a second position, and wherein the mowing deck height above the ground surface is a function of the radius of the cam outer edge in contact with the shoulder.

2. The riding mower of claim 1 wherein the lever is a foot actuatable lever.

3. The riding mower of claim 1 and further comprising a handle connected to the cam wheel, the handle enabling a user to rotate the cam wheel.

4. The riding mower of claim 3 wherein the cam wheel is fixed on a shaft rotatable by the handle, the shaft rotationally connected to the frame of the mower.

5. The riding mower of claim 4 and further comprising a height selector wheel fixed to the rotatable shaft adjacent to the cam wheel, the height selector wheel comprising a plurality of circumferential notches, wherein each notch corresponds to a different radius of the cam wheel.

6. The riding mower of claim 5 and further comprising a latch pivotally connected to the frame of the mower, the latch comprising a finger, the finger of the latch engaging a notch of the height selector wheel when the latch is in a first position, and the finger of the latch disengaging the notch when the latch is in a second position, the cam wheel being rotatable by the handle when the latch is in the second position.

7. The riding mower of claim 6 wherein the height selector wheel comprises a first planar surface oriented towards the operator seating area, the first planar surface having indicia at each notch indicative of a height of the mowing deck relative to the ground surface when the finger of the latch engages the notch.

8. The riding mower of claim 1 and further comprising a transport lock, the transport lock rotatably connected to the frame of the mower proximate the operator seating area, the transport lock having a handle and a finger, the finger engaging the shoulder of the moveable arm when the lever is in the second position and the transport lock is in a first position to secure the mowing deck in a fully raised position, and the finger disengaging the shoulder when the transport lock is in a second position to permit the lever to move to the first position.

9. A riding mower having a deck lift system for adjusting the height of a mowing deck relative to a ground surface, the mower having an operator seating area and a frame, the deck lift system comprising:
    a rear rotating assembly rotatably connected to the frame and connected to a rear portion of the mowing deck;
    a front rotating assembly rotatably mounted to the frame and connected to a front portion of the mowing deck;
    linking members connecting the front and rear rotating assemblies;
    a means for operating the deck lift system to raise and lower the mowing deck, wherein the means for operating comprises:
        a lever pivotally connected to the frame proximate to the operator seating area; and
        a displaceable arm having a first end pivotally connected to the lever and a second end connected to the rear rotating assembly of the deck lift system; and
    means operable within the operating means for adjusting the height of the mowing deck, wherein the means for adjusting the deck height comprises:
        a shoulder connected to the arm between the first end and the second end, the shoulder extending normal to a direction of displacement of the displaceable arm; and
        a cam wheel rotationally connected to the frame of the mower proximate the shoulder of the arm, the cam wheel having an axis of rotation, an outer edge, and a varying radius relative to the axis of rotation, wherein a portion of the cam outer edge contacts the shoulder when the mowing deck is in the deck down position, and wherein the height of the mowing deck above the ground surface in the deck down position is a function of the radius of the cam outer edge in contact with the shoulder.

10. The riding mower of claim 9 wherein the means for adjusting the deck height at the deck down position additionally comprises means for locking the cam wheel at a position representative of a selected deck height.

* * * * *